United States Patent
Bressoud

(10) Patent No.: US 7,220,197 B2
(45) Date of Patent: May 22, 2007

(54) TRACKED DRIVE DEVICE

(75) Inventor: Patrick Bressoud, Choex (CH)

(73) Assignee: Plumettaz SA, Bex (CH)

( * ) Notice: Subject to any disclaimer, the term of this patent is extended or adjusted under 35 U.S.C. 154(b) by 596 days.

(21) Appl. No.: 10/482,519

(22) PCT Filed: Jun. 6, 2002

(86) PCT No.: PCT/CH02/00299

§ 371 (c)(1),
(2), (4) Date: Dec. 29, 2003

(87) PCT Pub. No.: WO03/008314

PCT Pub. Date: Jan. 30, 2003

(65) Prior Publication Data

US 2004/0195287 A1 Oct. 7, 2004

(30) Foreign Application Priority Data

Jul. 18, 2001 (CH) .................................. 1327/01

(51) Int. Cl.
*B62J 13/00* (2006.01)
*B65H 20/00* (2006.01)

(52) U.S. Cl. ............... 474/144; 226/172; 226/174; 226/177; 198/461.1

(58) Field of Classification Search ............... 474/144, 474/150, 152–153, 155; 226/172–175, 190, 226/195; 198/461.1, 605, 626.1, 861.15; 254/134.3

See application file for complete search history.

(56) References Cited

U.S. PATENT DOCUMENTS

| | | | |
|---|---|---|---|
| 2,679,924 A | 6/1954 | Powell | |
| 2,981,454 A * | 4/1961 | Dickinson et al. | 226/172 |
| 3,430,832 A * | 3/1969 | Meyer | 226/180 |
| 3,620,432 A * | 11/1971 | Emery | 226/172 |
| 4,173,278 A * | 11/1979 | Reitter | 198/461.1 |
| 4,285,454 A | 8/1981 | Plumettaz | |
| 4,655,291 A * | 4/1987 | Cox | 166/77.51 |
| 5,884,384 A | 3/1999 | Griffioen | |
| 5,967,495 A | 10/1999 | Kaminski et al. | |
| 6,189,758 B1 | 2/2001 | Cherix | |
| 6,230,955 B1 * | 5/2001 | Parks | 226/190 |
| 6,644,467 B1 * | 11/2003 | Chiuch | 198/867.15 |

FOREIGN PATENT DOCUMENTS

DE 2725897 A1 * 12/1977
EP 0185788 A1 * 2/1986

* cited by examiner

Primary Examiner—Marcus Charles
(74) Attorney, Agent, or Firm—Pearne & Gordon LLP

(57) ABSTRACT

The tracked drive device particularly protected by its frame or hood as well as by protective plates, so as to prevent any accidental insertion of a finger or any other part of the human body between the track elements. The arrangement makes access to the track, for replacement or maintenance, particularly difficult. The invention provides a pivoting construction of the driving device, whereby the driving mechanisms become easily accessible, thus facilitating track change.

9 Claims, 1 Drawing Sheet

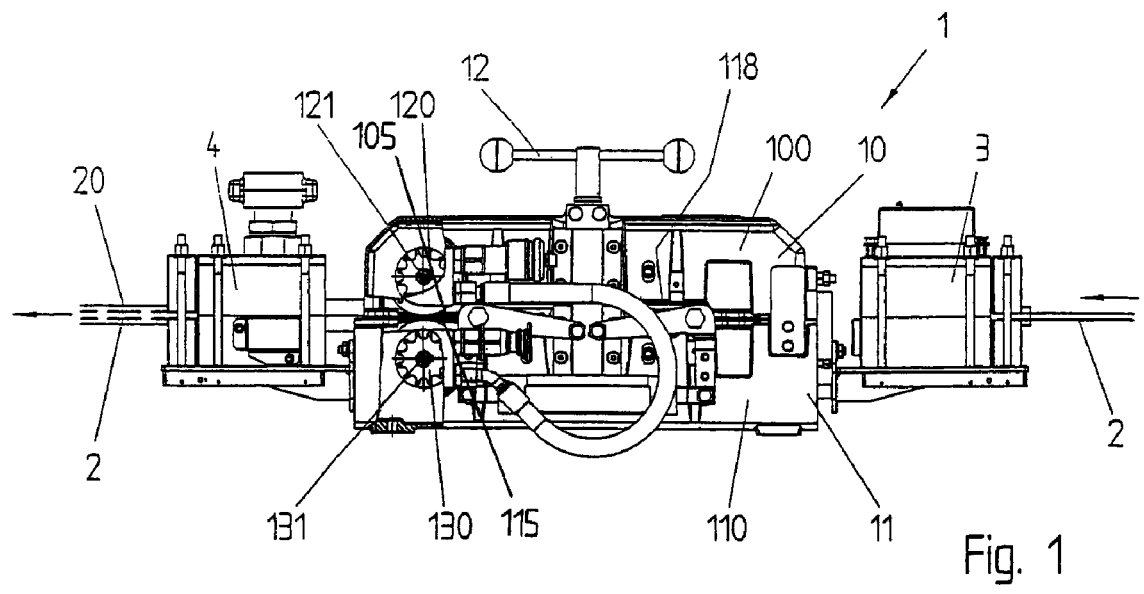
Fig. 1
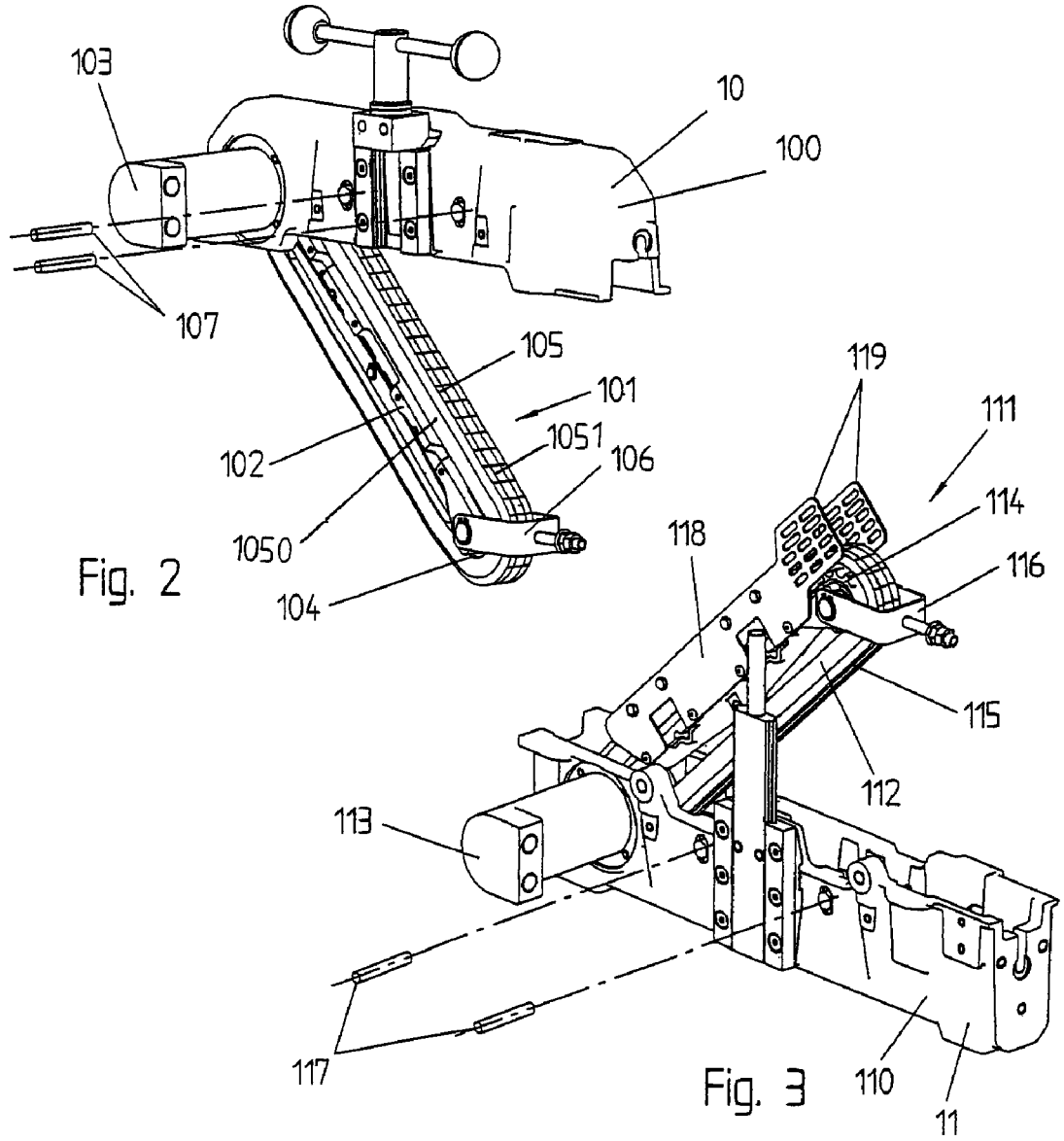
Fig. 2
Fig. 3

TRACKED DRIVE DEVICE

The present invention concerns slender drive element devices, in particular those provided with drive tracks in the form of endless chains or belts, able to drive the said slender elements in a translation movement, the invention more particularly concerning the means facilitating access to the said endless chains or belts in order to facilitate the changing thereof.

BACKGROUND OF THE INVENTION

A particular case of a drive device as described in general terms above is a tracked drive device provided for driving cables, tubes or other elements with an essentially cylindrical cross-section in a longitudinal translation movement.

The U.S. Pat. No. 5,884,384 describes a method of placing, by blowing, one or more empty cables or tubes in a tube laid in the ground. The device used for this purpose comprises two endless chains, each carrying a plurality of drive pieces disposed successively on the chain, and depicted for example in U.S. Pat. No. 2,679,924, each of the said drive pieces being provided with a driving sole plate having a form adapted to the element or elements to be driven. A rectilinear length of each of the chains circulates in parallel, facing the corresponding length of the other chain, the element or elements to be driven being clamped between the driving sole plates of the drive pieces facing each other.

Since the driving sole plates mounted on the chains have a form and dimensions adapted to the element or elements to be driven, it is necessary to change the said sole plates or respectively to change the chain, at each change of form or dimension of the element to be placed.

Moreover, safety standards require that each of the two chains as well as the drive pieces and sole plates be housed in frames, casing or hoods, arranged so that it is impossible to accidentally slide therein a finger or any other part of the human body, so as to prevent any injury.

This latter requirement therefore makes it difficult to gain access to the chains in order to be able to remove them so as to exchange them for chains provided with drive pieces or respectively sole plates having a form and dimensions adapted to the next product to be placed.

SUMMARY OF THE INVENTION

The aim of the present invention is therefore to propose a device for driving slender elements arranged so that the removal and mounting of the drive means are facilitated thereby.

This aim is achieved by drive devices as described herein and equivalents thereof.

A particular embodiment of a device according to the invention is described below, a description which is to be considered with regard to the accompanying drawing comprising the figures.

FIG. 1 depicts a side view of a complete drive device for a slender element in the working position, FIG. 2 depicts a view in perspective of the open top portion of part of the previous device;

FIG. 3 depicts the open bottom portion of the same device part.

DESCRIPTION OF THE PREFERRED EMBODIMENTS

The device 1 for driving a slender element 2, here a cable, is generally associated, as can be seen in FIG. 1, with a first device 3 for measuring speed and placing length, as well as a device 4 for injecting a fluid responsible for introducing a flow of the fluid inside a tube 20 assisting with the placing of the cable 2 inside the tube 20. This placing method being known, it will not be described more precisely here.

FIG. 1 shows that the drive device 1 is composed of a top portion 10 and a bottom portion 11, the two portions being held together by means 12 for fixing together the two portions and adjusting the separation of the drive mechanism according to a known technique. Consequently the means 12 make it possible to disconnect the two portions 10 and 11 in order to obtain two separate portions, as can be seen in the following figures.

In operation, as can be seen in FIG. 1, the two frames, casings or hoods 100 and 110 of the top 10 and bottom 11 portions have their edges facing each other directly in contact or very close to each other, generally leaving no space or a minimum space between the said portions. For the cases where, over an interface length between the two portions, there would be too much space remaining, it can be seen in FIG. 3 that the drive mechanism is also protected by two lateral plates 118 thus providing complete safety for the device against any accidental intrusion of a finger or any other part of the human body.

Since the drive mechanisms are thus deeply sunk in the frames, access to the drive chains for removing and exchanging them is difficult.

The drive mechanisms 101 or respectively 111 of each of the two portions 10 and 11 each comprise, as can be seen in FIGS. 2 and 3, a chassis 102, or respectively 112, carrying two toothed wheels on its ends, a first one 120 or respectively 130 visible in partial sections in FIG. 1, each mounted on a spindle 121 or respectively 131 directly driven by a motor 103 or respectively 113, the second toothed wheel 104 or respectively 114 serving as a return wheel for the endless chain 105 or respectively 115, on which there are mounted the drive pieces 1050 provided with driving sole plates 1051 as described previously, the mechanism is completed by a device for the mechanical tensioning of the endless chain, consisting, according to this embodiment of a stirrup 106 or respectively 116, fixed firstly to the spindle of the toothed return wheels 104 or respectively 114, and provided with a threaded rod able to be inserted in a corresponding opening in the frame 100 or respectively 110, the tensioning being provided by the tightening of a bolt on the said threaded rod. In this embodiment of the clamping device, at least one of the housings for the spindles carrying the toothed wheels is oblong so as to allow the said tensioning of the drive chain.

According to another embodiment of the mechanical tensioning device for the endless chain, this, not shown in the figures, is directly mounted on the chassis 102 and 112 and is able, by a known means with an adjustment screw and/or a knuckle joint, to slightly bring together or separate the spindles of the toothed wheels, thus putting the chain under tension.

Pins 107 or respectively 117 pass through holes provided on the one hand in the frames 100 and 110 serving to keep the chassis 102 or respectively 112 in place, each in its respective frame.

As mentioned previously, one of the portions of the drive device, here the bottom portion, advantageously comprises, on its drive mechanism 111, two protective plates 118, disposed on each side of the said mechanism and blocking any openings between the two frames, as can be seen in FIG. 1. Each of the said protective plates preferably comprises an extension 119 on its end closest to the end for insertion of the slender element 2, so as to prevent the introduction of a finger or any other portion of the human body through this insertion opening.

For changing the drive chains, it suffices now to separate the measuring 3 and blowing 4 devices of the drive device 1, and then to separate the top portion 10 from the bottom portion 11 of the said device, as a result of which, for each of the portions, by relaxing the chain and removing the pins 107 and 117, it is possible to make each of the drive mechanisms pivot about its drive spindle, as depicted in FIGS. 2 and 3, thus making the chains 105 and 115 directly accessible in order to be removed in a conventional manner. The mounting of the new chains takes place exactly in the reverse order of what has just been described.

The facilitated access means to the drive mechanism have been described above for a mechanism for driving an endless chain provided with drive pieces each comprising a driving sole plate. It is clear that similar facilitated access means can also be provided when the drive mechanism comprises a belt, flat or shaped, which it may also be necessary to change. Likewise, these facilitated access means have been described as making the drive mechanisms pivot about drive spindles; although this arrangement is advantageous, it would be just as possible to make the mechanisms pivot about the return spindles. Moreover it is obvious that the fixing and clamping device 12 as described previously is not essential to the arrangement and that it can be designed differently from what has been described here. And finally, such facilitated means of access to a tracked drive mechanism can be used for devices for driving slender elements other than the one described above solely by way of example.

The invention claimed is:

1. A device for driving a slender element comprising a top portion comprising a first drive mechanism for a first endless track and a bottom portion comprising a second drive mechanism for a second endless track, each endless track comprising at least one rectilinear portion, the rectilinear portions of said tracks being pressed against two opposite faces of the said slender element and driving said slender element in translation, each of the said top and bottom portions being covered with a frame or hood surrounding the corresponding drive mechanism so that, in the working position of the said drive device, there remains no sufficient opening between the said frames or hoods through which a finger could be inserted accidentally between the said top and bottom portions, each of the said drive mechanisms being mounted in the said top and bottom portions so as to pivot about a spindle, so as to be able easily to be at least partially extracted from the corresponding frame or hood, in order to facilitate access to the track which it contains, for removal or respectively mounting thereof.

2. A drive device according to claim 1, each drive mechanism comprising a longitudinal frame comprising two ends, each frame being provided at a first one of its ends with a drive spindle carrying a drive wheel and at the other of its ends with a return spindle carrying a return wheel, the track passing over the drive wheel and the return wheel, as well as means of fixing the said longitudinal support in the corresponding portion.

3. A drive device according to claim 2, the means of fixing the longitudinal support in the corresponding portion comprising the drive spindle or the return spindle, the ends of which are fixed in housings in the corresponding frame or hood, allowing a pivoting of the drive mechanism about the said spindle, as well as a device for locking the drive mechanism in its hood.

4. A drive device according to claim 3, the locking device comprising at least one pin able to lock the drive mechanism in the folded position in the frame or the corresponding hood.

5. A drive device according to claim 4, the locking mechanism also comprising a device for putting the track under mechanical tension.

6. A device according to claim 1, at least one of the drive mechanisms comprising a protective plate on each of its longitudinal lateral faces.

7. A device according to claim 6, the protective plates comprising, on their end close to the insertion orifice of the said slender element, an extension able to prevent accidental insertion of a finger.

8. A device according to claim 1, each track comprising an endless chain provided with drive pieces disposed successively on the said chain and each carrying a driving sole plate, said drive pieces and driving sole plates being provided for driving said slender element.

9. A device according to claim 1, each track comprising an endless belt.

* * * * *